Figure 1:
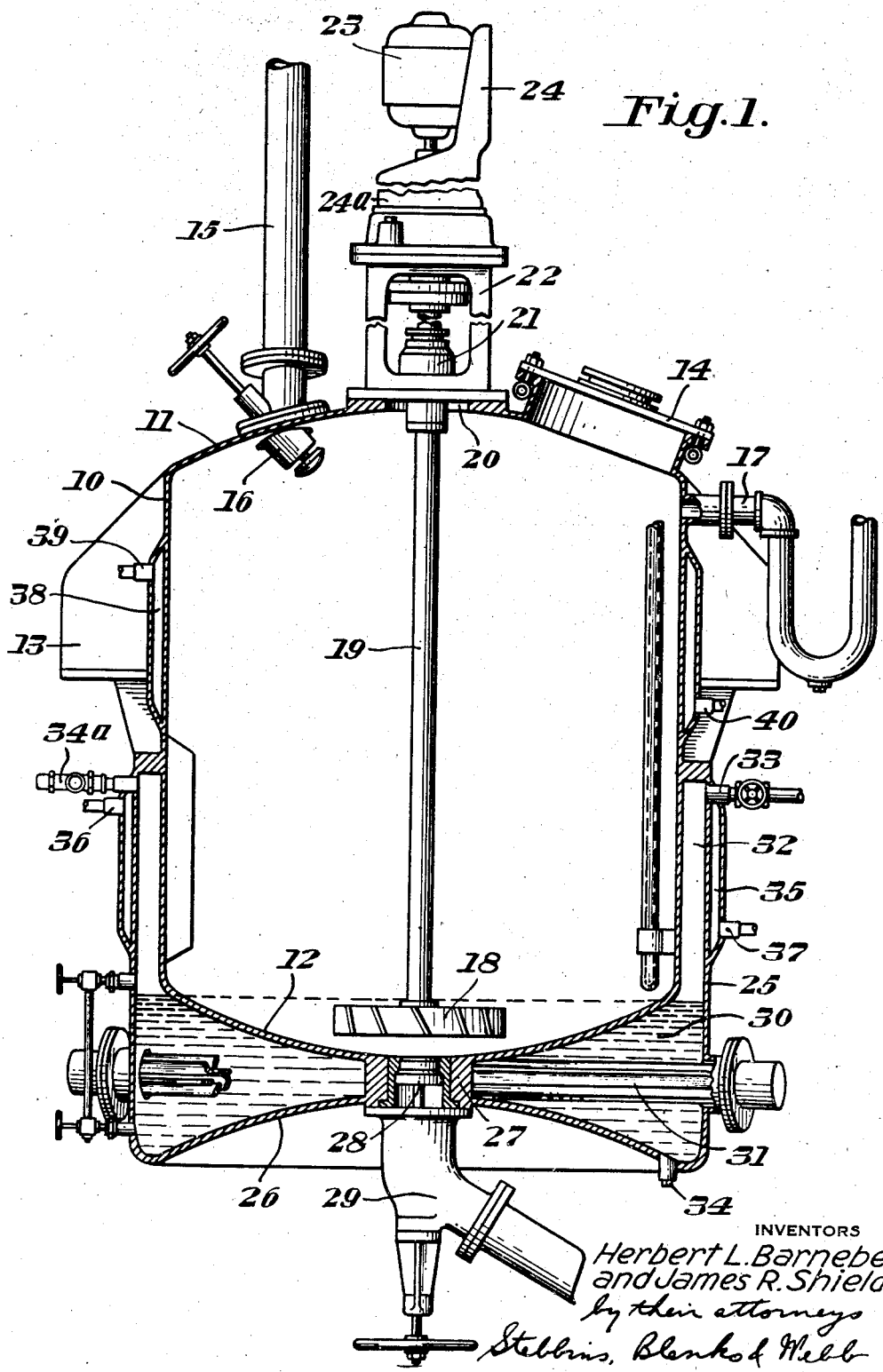

June 7, 1949.　　H. L. BARNEBEY ET AL　　2,472,362
HEAT EXCHANGE APPARATUS

Filed Nov. 18, 1944　　2 Sheets-Sheet 1

INVENTORS
Herbert L. Barnebey
and James R. Shields
by their attorneys
Stebbins, Blenko & Webb June 7, 1949. H. L. BARNEBEY ET AL 2,472,362
HEAT EXCHANGE APPARATUS
Filed Nov. 18, 1944 2 Sheets-Sheet 2
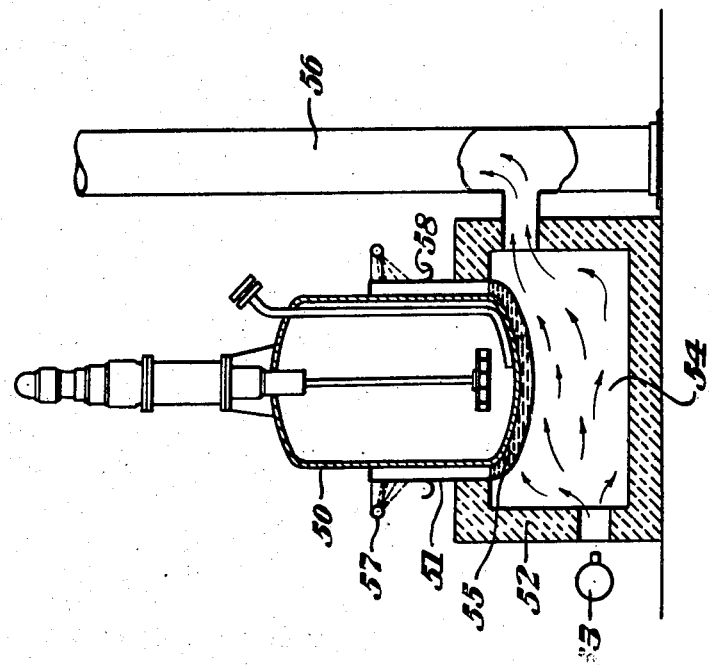
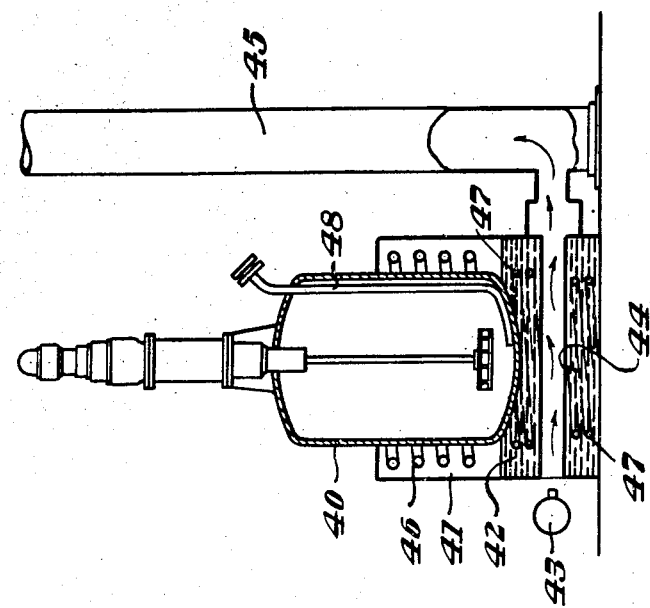
INVENTORS
Herbert L. Barnebey
and James R. Shields
by their attorneys
Stebbins, Blenko & Webb Patented June 7, 1949

2,472,362

UNITED STATES PATENT OFFICE 2,472,362

HEAT-EXCHANGE APPARATUS

Herbert L. Barnebey, Oakmont, and James R. Shields, Pittsburgh, Pa., assignors to Blaw-Knox Company, Pittsburgh, Pa.

Application November 18, 1944, Serial No. 564,078

3 Claims. (Cl. 257—6)

This invention relates broadly to heat-exchange apparatus and, in particular, to a processing kettle or autoclave having a closed jacket adapted to contain vaporizable liquid for heating and cooling by successive vaporization and condensation of the liquid.

The invention also relates to a species of electrically heated kettle more generally claimed in the copending application of Arne B. Olson, Serial No. 564,101, filed November 18, 1944, for Thermal processor, now Patent No. 2,467,492 issued April 19, 1949, in which a different species is disclosed.

Various means have been employed heretofore for heating processing kettles. In certain processing operations, it is desirable to cool the charge to some degree, at least, after it has been heated. Systems used heretofore for heating and cooling kettles require the interconnecting with pumps, valves and piping of several vessels including a separate external boiler for supplying vaporized liquid to a jacket surrounding the kettle and condensing and separate external cooling equipment for collecting the liquid, this collected liquid being subsequently supplied to the kettle jacket for cooling the contents. This system is quite costly and requires considerable floor space.

We have invented a novel form of processing kettle having self-contained heating and cooling means, which can be manufactured at relatively low cost and requires only a relatively small floor area. In a preferred embodiment, our invention comprises a kettle having an integral jacket about the bottom and lower portion thereof adapted to contain a vaporizable liquid. Heating means, preferably of the immersion type, extend into the jacket to cause vaporization of the liquid when it is desired to heat the contents of the kettle. A cooling jacket extends around the upper portion of the heating jacket and a separate cooling jacket may also be provided for the upper portion of the kettle.

Further details, novel features and advantages of our invention will become apparent during the following complete description which refers to the accompanying drawings.

In the drawings,

Figure 1 is a vertical, central section through the processing kettle of our invention, with parts shown in elevation; and Figures 2 and 3 are similar views, somewhat diagrammatic, illustrating modifications.

Referring in detail to the drawings, and for the present to Figure 1, the kettle of our invention comprises a generally cylindrical container 10 having dished heads 11 and 12 forming the top and bottom thereof, respectively. Legs 13 extending radially from the kettle permit it to be mounted on any suitable support. The top 11 is provided with a manway 14 and a vapor outlet 15 having a valve 16 therein. An inlet connection 17 extends from the side of the kettle. An agitator 18 is mounted on the lower end of a shaft 19 extending through an opening 20 in the top 11. The shaft is journaled on a bearing 21 carried in a frame 22 which provides a closure for the opening 20. A motor 23 mounted on a bracket 24, extending upward from the frame 22, drives the shaft 19 through suitable gear reducer 24a, the casing of which may be integral with bracket 24.

A jacket 25 extends around the lower portion and bottom of the kettle. The jacket includes a bottom 26 which is concave exteriorly and disposed coaxially with the bottom 12 which is concave interiorly. A valve seat 27 extends through the jacket bottom and kettle bottom and a valve 28 cooperating therewith controls the discharge of the contents of the kettle through an outlet 29.

The jacket 25 provides a sealed chamber for a fixed body of readily vaporizable liquid 30, such as the mixture of diphenyl and diphenyl oxide. In order to heat and vaporize the liquid, we provide electrical immersion heaters 31 of any suitable type extending through the wall of the jacket at an oblique angle to the radius, and substantially tangent to an inscribed circle smaller in diameter than the jacket. Such heaters are commonly composed of a plurality of heating elements each consisting of a sheath containing a resistance coil imbedded in insulating material, the ends of the coil having suitable connections to a source of electric current. Naked coils on insulated supports are also sometimes used. The flow of current through the coils causes heating thereof by their electrical resistance, and the liquid 30 is heated by contact with the hot coils. The bottom of the kettle and the portion of the charge in contact therewith are heated by contact with the liquid 30. When the liquid boils, of course, hot vapor fills the space 32 above the surface of the liquid and gives up its heat to the wall of the kettle, being thereby condensed and falling down into the pool in the lower portion of the jacket. The jacket is provided with a valved filling connection 33, a drain plug 34 adjacent the bottom, and a safety valve 34a.

In many processing operations, especially where the reaction is exothermic, it is desirable to remove heat from the charge to a limited degree, at least, for purposes of temperature control. Even if the reaction carried on in the vessel does not require removal of heat, it is sometimes advantageous to cool the charge before emptying the kettle either to deliver it at a desired lower temperature for further processing or to prevent a film of the material constituting the charge from being baked on to the interior of the kettle. We accordingly provide a cooling jacket 35 extending around the vapor space 32 of the heating jacket 25. The jacket 35 has inlet and outlet connections 36 and 37 whereby cooling water or other fluid may be circulated therethrough. It will be understood that when the heating stage of the reaction carried on in the kettle has been completed, the supply of current to the heaters 31 is discontinued, and cooling liquid is circulated through the jacket 35. This causes condensation of vapor in the space 32. The heat of the charge is transmitted through the bottom 12 of the vessel, and causes boiling of the liquid 30. The resulting vapor ascending into the space 32 is condensed, and heat is thus continuously removed from the charge maintaining its temperature of reaction constant on cooling the charge until its temperature has been lowered to the desired value as the case may be. The value 28 is then opened and the contacts of the vessel discharged.

Although the cooling process just described involves a change of state of the fluid medium within the jacket from a liquid to a vapor, the jacket of our apparatus is constructed both to withstand substantial pressures and high vacuum, and thus provides that the boiling of the liquid may be continued to low sub-atmospheric pressures. The temperature of the fluid medium may be varied over a very wide range, from some boiling point of the medium at a high pressure during the heating step to the boiling point at pressures approaching zero absolute; and accurate control of these temperatures can be obtained by regulating the supply of heat or cooling water in accordance with the vapor pressure in the jacket. Our apparatus thus provides not merely a simplification of structure, but an improvement in temperature control, accurately limiting either or both the maximum and minimum temperatures to desired values.

We provide a further cooling jacket 38 around the upper portion of the vessel, having inlet and outlet connections 39 and 40 for cooling fluid. Circulation of cooling fluid through this jacket expedites the cooling of the vessel contents.

The advantages of the invention described above will doubtless be apparent immediately. The heating system is entirely self-contained, there being no external boiler or condenser. Only a relatively small volume of heating fluid is required so that it can be quickly brought up to the boiling point. The thermal efficiency of the apparatus is high since there is no heat lost in piping connections, the generation and condensation of vapor taking place immediately adjacent the vessel wall. The arrangement of the heating elements is such as to afford a maximum heating capacity, for the available space. The exteriorly concave shape of the bottom of the jacket provides high resistance to internal or external pressure and reduces the over-all head room required.

In a modified form of the invention shown in Figure 2, a reaction vessel or processing kettle 40 has its lower portion enclosed in a heating jacket 41 containing vaporizable liquid 42. The liquid is heated by any convenient means, for example, combustion gases delivered by burners 43 through tubes 44 immersed in the liquid, the tubes being connected to a stack 45. Cooling coils 46 are disposed in the vapor space of the jacket 41 and additional cooling coils 47 are immersed in the liquid. The vessel 40 has a blow pipe 48 for the discharge of its contents, instead of a bottom discharge valve, as in the case of the embodiment shown in Figure 1.

It will be apparent that when the burners 43 are fired, the liquid 42 is heated to the vaporization point and that the resulting vapor is condensed on the exterior of the vessel 40, giving up its heat to the contents of the latter. When the heating stage has been completed, the circulation of cooling fluid through the coils 46 and 47 will quickly cool the vessel and its contents.

Figure 3 illustrates a further modification in which a kettle 50, having a jacket 51, is installed in a setting 52 having burners 53 firing into a combustion chamber 54. The jacket 51 has a vaporizable liquid 55 therein subject to direct heating by the combustion products passing through the chamber 54 and thence through a stack 56. The kettle and its contents are heated by vaporization of the liquid and condensation thereof on the exterior of the vessel as before. Cooling of the vessel and its contents is effected by a spray pipe 57 extending around the jacket 51 and adapted to discharge sprays of cooling liquid thereon. A collecting trough 58 extends around the vessel below the spray pipe. It will be evident that this modification operates in about the same manner as that shown in Figure 2, the principal difference being that the cooling liquid is discharged against the exterior of the vapor space of the heating jacket, instead of circulated through a coil therein.

The modified forms of the invention, of course, are characterized by advantages similar to those of the embodiment of Figure 1 mentioned above.

Although we have illustrated and described but a preferred embodiment and certain modifications of our invention, it will be understood that changes in the details of construction and operation may be made without departing from the spirit of the invention or the scope of the appended claims.

We claim:

1. In a method of successively heating and cooling the contents of a vessel by means of a fluid medium, the steps of confining a body of vaporizable fluid in a hermetically sealed space about the bottom and sides of a vessel to be heated defined by the vessel wall and an auxiliary condensing surface, maintaining a portion of said fluid body in the liquid state as a pool contacting the bottom of said vessel, first applying extraneous heat to boil the liquid and heat the vessel and its contents by exchange of heat through the vessel walls from the hot liquid and condensing vapors, then ceasing to apply extraneous heat to the liquid, and finally extraneously cooling said auxiliary condensing surface causing the vessel and its contents to cool by boiling the liquid pool in contact with said vessel bottom, and condensing the resulting vapor on said surface.

2. A reactor vessel adapted for the processing of a charge of material which requires initial heating to reaction temperature followed by the abstraction of heat to prevent overprocessing, comprising a chamber accommodating said charge, a sealed jacket enclosing the bottom and lower portion of said chamber adapted to contain a shallow pool of vaporizable liquid in contact with said bottom and leave a substantial vapor space above the surface of said pool, a second jacket around the upper portion at least of said first-mentioned jacket, means for circulating a cooling fluid through said second jacket, and a plurality of electric-resistance immersion heaters extending through the wall of said first-named jacket and into said pool, said heaters being arranged substantially in pinwheel fashion in a horizontal plane, whereby energization of said heaters causes boiling of said liquid to heat the charge in the chamber initially to processing temperature by condensation of the vapor extending into said space on the chamber wall and, after the charge attains said temperature and the heaters are deenergized, the heat of the charge causes continued boiling of said liquid and is removed by condensation of the vapor on the wall of said first-named jacket cooled by said second jacket.

3. A reactor vessel adapted for the processing of material which requires initial heating to reaction temperature followed by the abstraction of heat to prevent overprocessing, comprising a chamber accommodating said charge, said chamber having an upwardly concave bottom, a sealed jacket enclosing said bottom and the lower portion of said chamber adapted to contain a shallow pool of vaporizable liquid in contact with said bottom and leave a substantial vapor space above the surface of said pool, said jacket having a downwardly concave bottom substantially concentric with said bottom of said chamber, said jacket further having an outer heat transmitting wall portion at least adjacent said vapor space, a central discharge port in said bottom of said chamber which passes through said bottom of said jacket at the narrowest point between said bottoms, and a plurality of electric-resistance immersion heaters extending through the wall of the jacket and into said pool, said bottom being spaced apart a sufficient distance to accommodate said heaters, said heaters being arranged substantially in pinwheel fashion in a horizontal plane between said bottoms, whereby energization of said heaters causes boiling of said liquid to heat the charge in the chamber initially to processing temperature by condensation of the vapor ascending into said space on the chamber wall and, after the charge attains said temperature and the heaters are deenergized, the heat of the charge causes continued boiling of said liquid and is removed by condensation of the vapor on the wall of the jacket.

HERBERT L. BARNEBEY.
JAMES R. SHIELDS.

REFERENCES CITED

The following references are of record in the file of this patent:

UNITED STATES PATENTS

| Number | Name | Date |
| --- | --- | --- |
| 653,823 | Shimer | July 17, 1900 |
| 891,492 | Lloyd | June 23, 1908 |
| 969,018 | Willmann | Aug. 30, 1910 |
| 1,366,268 | McChesney | Jan. 18, 1921 |
| 1,585,671 | Harms | May 25, 1926 |
| 1,598,185 | Willard | Aug. 31, 1926 |
| 1,709,588 | Lenning | Apr. 16, 1929 |
| 1,821,278 | Schuster | Sept. 1, 1931 |
| 2,083,396 | Philipp | June 8, 1937 |
| 2,215,729 | Ruttimann | Sept. 24, 1940 |
| 2,236,837 | Rimmel | Apr. 1, 1941 |
| 2,279,000 | Larson | Apr. 7, 1942 |

FOREIGN PATENTS

| Number | Country | Date |
| --- | --- | --- |
| 14,251 | Great Britain | June 17, 1909 |

Certificate of Correction

Patent No. 2,472,362.  June 7, 1949.

HERBERT L. BARNEBEY ET AL.

It is hereby certified that errors appear in the printed specification of the above numbered patent requiring correction as follows:

Column 1, line 7, for the word "The" read *This*; column 3, line 27, for "value 28" read *valve 28*; line 28, for "contacts" read *contents*; column 6, line 1, for "bottom" read *bottoms*;

and that the said Letters Patent should be read with these corrections therein that the same may conform to the record of the case in the Patent Office.

Signed and sealed this 22nd day of November, A. D. 1949.

[SEAL]

THOMAS F. MURPHY,
*Assistant Commissioner of Patents.*